United States Patent
Phillips et al.

(10) Patent No.: US 10,054,670 B2
(45) Date of Patent: Aug. 21, 2018

(54) ADAPTIVE FREQUENCY CORRECTION FOR PULSE COMPRESSION RADAR

(71) Applicant: Navico Holding AS, Egersund (NO)

(72) Inventors: Roger Phillips, Auckland (NZ); Gregor Storz, Auckland (NZ); Lindsay Lilburn, Auckland (NZ)

(73) Assignee: NAVICO HOLDING AS, Edersund (NO)

( * ) Notice: Subject to any disclaimer, the term of this patent is extended or adjusted under 35 U.S.C. 154(b) by 426 days.

(21) Appl. No.: 15/004,764

(22) Filed: Jan. 22, 2016

(65) Prior Publication Data

US 2016/0216368 A1    Jul. 28, 2016

Related U.S. Application Data

(60) Provisional application No. 62/107,335, filed on Jan. 23, 2015.

(51) Int. Cl.
    *G01S 7/40*    (2006.01)
    *G01S 7/282*    (2006.01)
    (Continued)

(52) U.S. Cl.
    CPC ............ *G01S 7/4008* (2013.01); *G01S 7/282* (2013.01); *G01S 7/2921* (2013.01); *G01S 13/28* (2013.01);
    (Continued)

(58) Field of Classification Search
    CPC ...... G01S 7/4008; G01S 7/282; G01S 7/2921; G01S 13/28; G01S 13/9307; G01S 13/956; G01S 2007/4013; Y02A 90/18
    (Continued)

(56) References Cited

U.S. PATENT DOCUMENTS

| 4,021,805 A | 5/1977 | Effinger et al. |
| 4,028,700 A | 6/1977 | Carey et al. |

(Continued)

FOREIGN PATENT DOCUMENTS

| CN | 101464513 A | 6/2009 |
| JP | 2982769 B2 | 11/1999 |

(Continued)

OTHER PUBLICATIONS

Pulse Compression; Wikipedia; https://en.wikipedia.org/wiki/Pulse_compression; Dec. 18, 2015 (accessed Jan. 22, 2016).

(Continued)

*Primary Examiner* — Frank J McGue
(74) *Attorney, Agent, or Firm* — Nelson Mullins Riley & Scarborough LLP (57) ABSTRACT

Various implementations described herein are directed to adaptive frequency correction for pulse compression radar. In one implementation, a method may include generating a first transmission signal using a first direct digital synthesizer of a pulse compression radar system based on frequency sweep coefficients. The method may also include comparing a frequency of the first transmission signal at a feedback loop of a phase locked loop circuit and a frequency of an ideal waveform signal. The method may further include generating adaptive frequency coefficients based on the comparison, where the adaptive frequency coefficients are configured to compensate for a difference between the frequency of the first transmission signal at the feedback loop and the frequency of the ideal waveform signal. The method may additionally include generating a compensated transmission signal using the pulse compression radar system based on the adaptive frequency coefficients and the frequency sweep coefficients.

20 Claims, 4 Drawing Sheets

(51) Int. Cl.
*G01S 7/292* (2006.01)
*G01S 13/28* (2006.01)
*G01S 13/92* (2006.01)
*G01S 13/95* (2006.01)
*G01S 13/93* (2006.01)

(52) U.S. Cl.
CPC ........ *G01S 13/9307* (2013.01); *G01S 13/956* (2013.01); *G01S 2007/4013* (2013.01); *Y02A 90/18* (2018.01)

(58) Field of Classification Search
USPC .......................................................... 342/174
See application file for complete search history.

(56) References Cited

U.S. PATENT DOCUMENTS

| | | | |
|---|---|---|---|
| 4,047,173 A | 9/1977 | Miller | |
| 4,114,154 A | 9/1978 | Sarfati | |
| 4,123,719 A | 10/1978 | Hopwood | |
| 4,204,174 A | 5/1980 | King | |
| 4,209,843 A | 6/1980 | Hyatt | |
| 4,211,485 A | 7/1980 | Koreicho | |
| 4,216,474 A | 8/1980 | Levine | |
| 4,243,988 A | 1/1981 | Kang et al. | |
| 4,328,495 A | 5/1982 | Thue | |
| 4,353,067 A | 10/1982 | Mims | |
| 4,566,010 A | 1/1986 | Collins | |
| 4,626,853 A | 12/1986 | Lee et al. | |
| 4,686,534 A | 8/1987 | Eddy | |
| 4,772,889 A | 9/1988 | Elleaume | |
| 4,800,388 A | 1/1989 | Okada | |
| 4,929,954 A | 5/1990 | Elleaume | |
| 4,989,010 A | 1/1991 | Crevoulin et al. | |
| 5,003,313 A | 3/1991 | Doriath | |
| 5,128,681 A | 7/1992 | McGroary et al. | |
| 5,141,308 A | 8/1992 | Danckwerth et al. | |
| 5,151,702 A | 9/1992 | Urkowitz | |
| 5,173,706 A | 12/1992 | Urkowitz | |
| 5,309,161 A | 5/1994 | Urkowitz et al. | |
| 5,389,933 A | 2/1995 | Golinsky | |
| 5,414,428 A | 5/1995 | Gallagher et al. | |
| 5,481,270 A | 1/1996 | Urkowitz et al. | |
| 5,926,125 A | 7/1999 | Wood | |
| 6,067,043 A | 5/2000 | Faure et al. | |
| 6,091,356 A | 7/2000 | Sanders | |
| 6,377,204 B1 | 4/2002 | Wurman et al. | |
| 6,433,671 B1 | 8/2002 | Nysen | |
| 6,522,176 B1 | 2/2003 | Davis | |
| 6,597,308 B2 * | 7/2003 | Isaji ........................ G01S 7/35 342/128 |
| 7,019,686 B2 | 3/2006 | Hester et al. | |
| 7,106,250 B2 | 9/2006 | Blunt et al. | |
| 7,675,458 B2 | 3/2010 | Hubbard et al. | |
| 7,688,257 B1 | 3/2010 | Christianson et al. | |
| 7,764,223 B2 | 7/2010 | Wade | |
| 8,022,863 B1 | 9/2011 | Nuthalapati | |
| 8,102,298 B2 | 1/2012 | Feigin et al. | |
| 8,193,972 B2 | 6/2012 | Hofele | |
| 2006/0223558 A1* | 10/2006 | Behzad ................ H04B 1/0082 455/502 |
| 2008/0111734 A1 | 5/2008 | Fam et al. | |
| 2009/0121920 A1 | 5/2009 | Mullarkey et al. | |
| 2009/0289836 A1* | 11/2009 | Frank ..................... G01S 7/4004 342/189 |
| 2012/0262332 A1 | 10/2012 | Ohnishi | |
| 2012/0293361 A1 | 11/2012 | Mowbray et al. | |
| 2015/0234036 A1* | 8/2015 | Asada ..................... G01S 7/282 342/175 |
| 2015/0247920 A1 | 9/2015 | Asada et al. | |
| 2016/0034633 A1* | 2/2016 | Han ..................... G06F 17/5081 716/115 |

FOREIGN PATENT DOCUMENTS

JP    2009-128278 A    6/2009
WO    2014-045927 A1    3/2014

OTHER PUBLICATIONS

Phase-Locked Loop; Wikipedia; https://en.wikipedia.org/wiki/Phase-locked_loop; Dec. 7, 2015 (accessed Jan. 22, 2016).
Direct Digital Synthesizer; Wikipedia; https://en.wikipedia.org/wiki/Direct_digital_synthesizer; Nov. 20, 2015 (accessed Jan. 22, 2016).
Chirp; Wikipedia; https://en.wikipedia.org/wiki/Chirp; Nov. 14, 2015 (accessed Jan. 22, 2016).
Chirp Compression; Wikipedia; https://en.wikipedia.org/wiki/Chirp_compression; Oct. 16, 2015 (accessed Jan. 22, 2016).
Side Lobe; Wikipedia; https://en.wikipedia.org/wiki/Side_lobe; Sep. 9, 2015 (accessed Jan. 22, 2016).
Understanding Direct Digital Synthesis (DDS); National Instruments; http://www.ni.com/white-paper/5516/en/; May 4, 2015 (accessed Jan. 22, 2016).
Radar Basics, Pulse Compression; Christian Wolff http://www.radartutorial.eu/08.transmitters/Intrapulse%20Modulation.en.html; Feb. 27, 2014 (accessed Jan. 22, 2016).
Radio-Frequency Sweep; Wikipedia; https://en.wikipedia.org/wiki/Radio-frequency_sweep; Dec. 8, 2012 (accessed Jan. 22, 2016).
U.S. Appl. No. 14/718,064, filed May 20, 2015; In re: Phillips et al; entitled *Amplitude Envelope Correction*.
U.S. Appl. No. 15/004,752, filed Jan. 22, 2016; In re: Phillips et al; entitled *Frequency Correction for Pulse Compression Radar*.

* cited by examiner

ADAPTIVE FREQUENCY CORRECTION FOR PULSE COMPRESSION RADAR

CROSS-REFERENCE TO RELATED APPLICATIONS

This application claims the benefit of and priority to U.S. Provisional Patent Application Ser. No. 62/107,335, filed Jan. 23, 2015 and titled PULSE COMPRESSION RADAR CORRECTION, the entire disclosure of which is incorporated herein by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

A radar system may be used in a number of scenarios. For example, a radar system may be used by an operator on board a vessel to safely navigate through a marine environment. In such an example, the radar system may be used to track neighboring vessels and obstacles for the purposes of collision avoidance, weather detection, situational awareness, and/or the like. As such, clear and unambiguous indications of the presence of a target and/or object may be useful. The presence of sidelobes, however, may arise in the signal processing of radar systems, and may impede an operator's ability to identify a target and/or object.

SUMMARY

Described herein are implementations of various technologies relating to adaptive frequency correction for pulse compression radar. In one implementation, a method may include generating a first transmission signal using a first direct digital synthesizer of a pulse compression radar system based on one or more frequency sweep coefficients, where the one or more frequency sweep coefficients correspond to an ideal waveform signal, and where the pulse compression radar system includes a phase locked loop circuit. The method may also include comparing a frequency of the first transmission signal at a feedback loop of the phase locked loop circuit and a frequency of the ideal waveform signal. The method may further include generating one or more adaptive frequency coefficients based on the comparison, where the one or more adaptive frequency coefficients are configured to compensate for a difference between the frequency of the first transmission signal at the feedback loop and the frequency of the ideal waveform signal. The method may additionally include generating a compensated transmission signal using the pulse compression radar system based on the one or more adaptive frequency coefficients and the one or more frequency sweep coefficients.

In another implementation, a method may include generating a first transmission signal using a first direct digital synthesizer of a pulse compression radar system based on one or more frequency sweep coefficients, where the one or more frequency sweep coefficients correspond to an ideal waveform signal, and where the pulse compression radar system includes a phase locked loop circuit. The method may also include comparing a frequency of the first transmission signal at a feedback loop of the phase locked loop circuit and a frequency of an output signal of a second direct digital synthesizer, where the first transmission signal at the feedback loop of the phase locked loop circuit comprises a down converted output signal from a voltage controlled oscillator of the phase locked loop, and where the output signal is generated based on the one or more frequency sweep coefficients. The method may further include generating one or more adaptive frequency coefficients based on the comparison, where the one or more adaptive frequency coefficients are configured to compensate for a difference between the frequency of the first transmission signal at the feedback loop and the frequency of the ideal waveform signal. The method may additionally include generating a compensated transmission signal using the pulse compression radar system based on the one or more adaptive frequency coefficients and the one or more frequency sweep coefficients.

In yet another implementation, a pulse compression radar system may include a processor and a memory. The memory may include a plurality of program instructions which, when executed by the processor, cause the processor to store in memory one or more frequency sweep coefficients, where the one or more frequency sweep coefficients correspond to an ideal waveform signal. The memory may also include a plurality of program instructions which, when executed by the processor, cause the processor to store in memory one or more adaptive frequency coefficients. The pulse compression radar system may also include a first direct digital synthesizer configured to generate a signal based on the one or more frequency sweep coefficients and the one or more adaptive frequency coefficients. The pulse compression radar system may further include a phase locked loop circuit configured to convert the frequency of the signal from the first direct digital synthesizer. The pulse compression radar system may additionally include a transmitter module configured to amplify the converted signal from the phase locked loop circuit for output by an antenna. Further, the one or more adaptive frequency coefficients may be generated based on a comparison of a frequency of a transmission signal at a feedback loop of the phase locked loop circuit and a frequency of the ideal waveform signal.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Various implementations directed to adaptive frequency correction for pulse compression radar will now be described in the following paragraphs with reference to FIGS. 1-4.

As noted above, a radar system may be used for a number of purposes. For example, a radar system may be used by an operator on board a vessel to safely navigate through a marine environment. In particular, the radar system may be used to track neighboring vessels and obstacles for the purposes of collision avoidance, weather detection, situational awareness, and/or the like. Although various implementations are described with reference to a marine vessel, it should be understood that some implementations may be used on land, such as for monitoring vessels in harbor.

A pulse compression radar system capable of transmitting signals (i.e., pulses) may be used. As is known to those skilled in the art, the pulse compression radar system may be used to transmit a pulse (i.e., a chirp) having a frequency which varies linearly with time. The transmitted pulse can be relatively long, thereby increasing the average output power to improve the signal to noise ratio. A return pulse may then be compressed by the system using a filter, where the filter delays the return pulse by an amount of time that varies with the frequency of the return pulse. Compressing the return pulse may increase the range resolution of the system. Increasing the range of frequencies in the transmitted pulse may increase the amount of possible compression, and may, as a result, increase the range resolution of the pulse compression radar system. To compress such transmitted pulses, an autocorrelation process may be used, as is known to those skilled in the art.

Further, to minimize artifacts or interfering echoes detected by the pulse compression radar system, the transmitted signal may be configured to be equivalent to a correlator reference signal (i.e., ideal waveform signal). The transmitted signal may be equivalent to the correlator reference signal if the signals have the same, or substantially the same, amplitude shape, frequency, and phase. In such an implementation, the pulse compression radar system may produce a main range lobe, the time position (i.e., range) of which is the position to be tested for the presence of a target and for estimating the parameters of that target.

However, if the transmitted signal and the correlator reference signal are not equivalent, then the pulse compression radar system may produce one or more range sidelobes, in addition to the main range lobe. The presence of the range sidelobes may result in interfering echoes that originate at ranges other than the range of the main lobe, which can cause incorrect estimates of the echo characteristics in the range covered by the main lobe.

Figure 1:
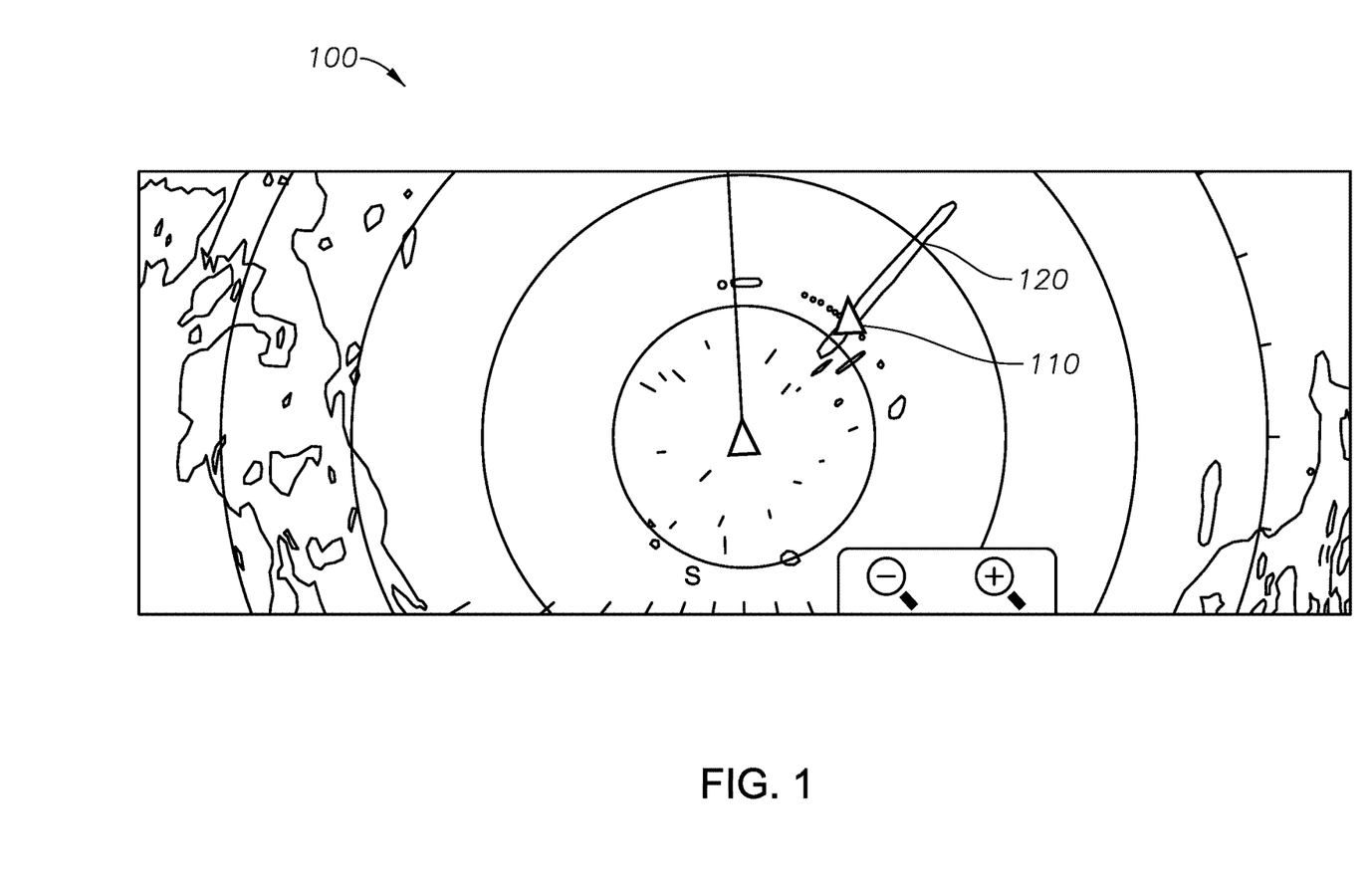
FIG. 1 illustrates a plan position indicator (PPI) display with range sidelobes in connection with implementations of various techniques described herein.

For example, FIG. 1 illustrates a plan position indicator (PPI) display 100 with range sidelobes in connection with implementations of various techniques described herein. The PPI display 100 is a radar display that illustrates radar return echoes. The PPI display 100 may be continuously updated as radar signals are received. A point target 110 illustrates a radar return from a relatively large marine vessel. In the illustrated display 100, the point target 110 is stretched into a line 120 on the display. This line 120 may be caused by a range sidelobe. The line 120 may prevent a user from determining whether or not there are objects present in the location of the line 120. For example, the line 120 may hide targets that are on either side of the marine vessel 110.

To minimize the occurrence of range sidelobes, the pulse compression radar system may be configured to have its transmitted signal be equivalent to a correlator reference signal, such that the signals have at least the same or substantially the same frequency. However, components of the pulse compression radar system may introduce errors (i.e., distortions) into the transmitted signal such that the transmitted signal and the correlator reference signal are not equivalent with respect to frequency.

For example, the pulse compression radar system may use a direct digital synthesizer (DDS), as further explained below, to frequency modulate a pulse signal onto a lower frequency. As noted above, the pulse signal may include a range of frequencies, where the rate of change in frequency in the range of frequencies of the signal may vary. In one example, the rate of change in the transmitted signal may range from 0.1 megahertz/microsecond (MHz/µs) to 10 MHz/µs. A phase locked loop (PLL) circuit, as further explained below, may receive the pulse signal from the DDS and convert the pulse signal to a microwave frequency (e.g., 3 to 10 gigahertz (GHz)) for marine radar. The PLL circuit, however, may cause frequency tracking errors where the rate of change of frequency is highest in the pulse signal, such that the PLL circuit produces a pulse signal to be transmitted that is not equivalent to the correlator reference signal with regards to frequency. As such, one or more range sidelobes may be produced by this pulse compression radar system.

Various implementations for a pulse compression radar system, as further explained below, may be used to minimize such range sidelobes.

System

Figure 2:
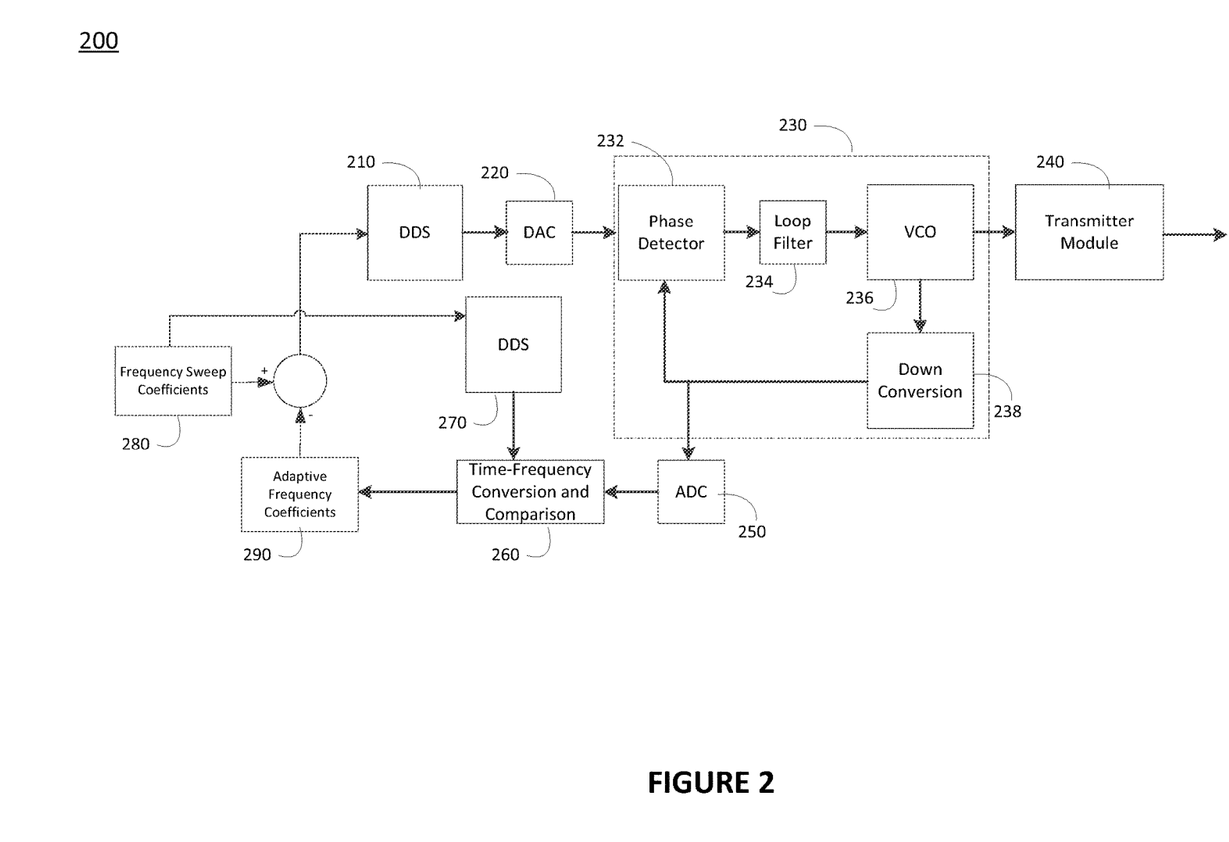
FIG. 2 illustrates a block diagram of a pulse compression radar system in accordance with implementations of various techniques described herein.

FIG. 2 illustrates a block diagram of a pulse compression radar system 200 in accordance with implementations of various techniques described herein. In one implementation, portions of the operations of the pulse compression radar system 200 may be performed by any computer system 400, any field-programmable gate array (FPGA), application specific integrated circuits ("ASICs"), gate arrays, logic circuits, and/or the like. For instance, the transmitter module, the PLL circuit, and/or the DDS may be implemented in one or more field-programmable gate arrays.

It should be understood that, while the operation of the pulse compression radar system 200 indicates a particular order of execution of operations, in some implementations, certain portions of the operations might be executed in a different order, and on different systems. Further, in some implementations, additional operations or steps may be added to the operation of the pulse compression radar system 200. Likewise, some operations or steps may be omitted.

The pulse compression radar system 200 may include a first direct digital synthesizer (DDS) 210, a digital-to-analog converter (DAC) 220, a phase locked loop (PLL) circuit 230, a transmitter module 240, an analog-to-digital converter (ADC) 250, time-frequency conversion and comparison circuitry 260, and a second DDS 270. The pulse compression radar system 200 may also use one or more frequency sweep coefficients 280 and one or more adaptive frequency coefficients 290.

The first DDS 210, as is known to those skilled in the art, may be used to generate a representation of a waveform (e.g., a sine wave) based on the one or more frequency sweep coefficients 280, where the waveform may be frequency modulated at a particular frequency (e.g., a relatively low frequency). In one implementation, the first DDS 210 may include a phase accumulator that receives the input, such that the phase accumulator may maintain a running total of the phase corresponding to the input. The representation of the waveform (e.g., a sine wave) may be output based on the phase. The frequency sweep coefficients 280 may correspond to the correlator reference signal (i.e., an ideal waveform signal) discussed above. The frequency sweep coefficients 280 may be stored in a memory of the pulse compression radar system 200, such as in one or more look-up tables. As is also discussed below, an initial waveform produced by the first DDS 210 may be based on the one or more frequency sweep coefficients 280, whereas later waveforms produced by the first DDS 210 may be based on the one or more frequency sweep coefficients 280 and the one or more adaptive frequency coefficients 290.

The DAC 220 may be used to convert a digital output of the first DDS 210 into an analog signal. In one implementation the DAC 220 may be part of the first DDS 210.

The PLL circuit 230 may receive the output waveform from the DAC 220. As shown in FIG. 2, the PLL circuit 230 may include a phase detector 232, a loop filter 234, a voltage controlled oscillator (VCO) 236, and down conversion circuitry 238. The phase detector 232 may be configured to compare two input signals and produce an error signal which is proportional to their phase difference. The error signal is then low-pass filtered via the loop filter 234, and used to drive the VCO 236, which creates an output phase. In particular, the phase detector 232 may compare the phase of the periodic signal generated by the VCO 236 with the phase of the signal from the DAC 220, and adjusts the VCO 236 to keep the phases matched. The output of the VCO 236 is fed through the down conversion circuitry 238 and back to the input of the phase detector 232, thereby producing a feedback loop of the PLL circuit 230. If the output phase of the down converted signal from the VCO 236 drifts, then the error signal may increase, causing the phase detector 232 to drive a phase of the output of the VCO 236 in the opposite direction so as to reduce the error. As such, the phase of the output signal of the PLL circuit 230 may be locked to the phase of the waveform from the DAC 220.

As noted above, the PLL circuit 230 may receive the signal from the DAC 220, and use the VCO 236 to convert the signal to a microwave frequency (e.g., 3 to 10 gigahertz (GHz)) for marine radar. The down conversion circuitry 238 of the feedback loop may be configured to down convert the output of the VCO 236 to a lower frequency before the signal is returned to the input of the phase detector 232.

The signal from the VCO may be output to the transmitter module 240. The transmitter module 240 may receive the signal from the PLL circuit 230 and amplify the signal for output by an antenna via a circulator. In one implementation, the transmitter module 240 may include a power amplifier. Echoes from targets in the antenna beam may be processed by a receiver. The echoes may be correlated with the correlator reference signal, as discussed above, to produce compressed pulses that represent target range and amplitude.

Adaptive Correction

As noted above, to minimize the occurrence of range sidelobes, the pulse compression radar system 200 may be configured to have its transmitted signal be equivalent to a correlator reference signal, such that the signals have at least the same or substantially the same frequency. However, components of the pulse compression radar system 200 may introduce errors (i.e., distortions) into the transmitted signal such that the transmitted signal and the correlator reference signal are not equivalent with respect to frequency.

As also noted above, the PLL circuit 230, however, may cause frequency tracking errors where the rate of change of frequency is highest in the pulse signal, such that the PLL circuit 230 may produce a pulse signal to be transmitted that is not equivalent to the correlator reference signal with regards to frequency. For example, the phase detector 232 may produce distortions in the transmitted signal of the system 200. As a result, the transmitted signal and the correlator reference signal may not be equivalent, and thus one or more range sidelobes may be produced by the pulse compression radar system 200.

In one implementation, one or more adaptive frequency coefficients 290 may be used by the pulse compression radar system 200 in order to ensure its transmitted signals are equivalent to the correlator reference signal, at least with respect to frequency. Using an initial waveform produced by the first DDS 210 (mentioned above), the adaptive frequency coefficients 290 may be used to reduce, compensate and/or correct for distortions in subsequent transmitted signals using previous signals. In particular, the adaptive frequency coefficients 290 may be combined with the one or more frequency sweep coefficients 280 at the first DDS 210 in order to produce the corrected transmitted signal from the system 200, where the one or more frequency sweep coefficients 280 correspond to the correlator reference signal (i.e., the ideal waveform signal).

In one implementation, to generate the adaptive frequency coefficients 290, an initial waveform may be produced by the first DDS 210 based on the one or more frequency sweep coefficients 280. The initial waveform may be passed through the DAC 220 and to the PLL circuit 230, including the phase detector 232. As noted above, the phase detector 232 may ultimately produce distortions in the transmitted signal of the system 200. Such an error may propagate through the loop filter 234, the VCO 236, and the down conversion circuitry 238 of the feedback loop in the PLL circuit 230. As such, the output of the down conversion circuitry 238 of the feedback loop may be fed into the ADC 250 and converted into a digital signal.

The converted digital signal may be received by the time-frequency conversion and comparison circuitry 260. The time-frequency conversion and comparison circuitry 260 may compare the frequency of this converted analog signal from the PLL circuit 230 to a frequency of the correlator reference signal (i.e., the ideal waveform signal).

In one implementation, the frequency of the correlator reference signal may be derived using a second DDS 270 and the one or more frequency sweep coefficients 280. The second DDS 270 may be identical to the first DDS 210. The output waveform signal of the second DDS 270 may correspond to the correlator reference signal. After application of time shifting and amplitude scaling as known in the art, the output waveform signal of the second DDS 270 may be compared to the converted digital signal from the PLL circuit 230 described above. In particular, the frequency of the output waveform signal of the second DDS 270 may be compared to the frequency of the converted digital signal from the PLL circuit 230. Such frequencies may be compared on a sample by sample basis of the respective signals.

Based on this comparison, the one or more adaptive frequency coefficients 290 may be generated. These adaptive frequency coefficients 290 may be used to compensate for the frequency differences between the distorted signal from the PLL circuit 230 (i.e., the converted digital signal from the feedback loop) and the correlator reference signal (i.e., the output waveform signal of the second DDS 270). The adaptive frequency coefficients 290 may be generated using any technique known to those skilled in the art.

In another implementation, the frequency of the correlator reference signal may be derived without use of the second DDS 270. In such an implementation, one or more wavelet processing techniques known in the art may be used. Such wavelet processing techniques may be used to derive a time-frequency curve of the correlator reference signal. This curve may be compared to a high resolution time-frequency curve derived from the distorted signal from the PLL circuit 230 (i.e., the converted analog signal from the feedback loop). Based on a comparison of these curves, the one or more adaptive frequency coefficients 290 may be generated.

Once generated, the adaptive frequency coefficients 290 may be stored in memory, as noted above. With the adaptive frequency coefficients 290 stored in memory, the system 200 may be run again, where the system 200 combines the adaptive frequency coefficients 290 with one or more frequency sweep coefficients 280 in order to produce a corrected transmitted signal. In one implementation, the system 200 may subtract the adaptive frequency coefficients 290 from frequency sweep coefficients 280 in order to reduce and/or compensate for frequency errors caused by the PLL circuit 230, where the differences between the coefficients may be used as input to the first DDS 210. In another implementation, the system 200 may invert the adaptive frequency coefficients 290 and add the frequency sweep coefficients 280 in order to reduce and/or compensate for frequency errors caused by the PLL circuit 230, where the sums of the coefficients may be used as input to the first DDS 210. In yet another implementation, the system 200 may combine the adaptive frequency coefficients 290 with the frequency sweep coefficients 280 using any subtraction technique, addition technique, multiplication technique, and/or other mathematical techniques in order to reduce and/or compensate for frequency errors caused by the PLL circuit 230, where the combined coefficients may be used as input to the first DDS 210. For example, the one or more adaptive frequency coefficients 290 may be expressed as one or more correction ratios. In such an example, these correction ratios may be multiplied with the one or more frequency sweep coefficients 280, resulting in a product which may be used as input to the first DDS 210.

With these changed inputs to the first DDS 210, the system 200 can be used in a working environment, such as on a marine vessel, in order to produce a corrected transmitted signal that is at least substantially equivalent to a correlator reference signal, at least with respect to frequency. In particular, the adaptive frequency coefficients 290 may be used to reduce and/or compensate for distortions in the transmitted signal of the system 200 (i.e., to pre-distort the transmitted signal).

In a further implementation, the system 200 may continuously update the adaptive frequency coefficients 290 in order to reduce and/or compensate for frequency errors caused by the PLL circuit 230. In a further implementation, the system 200 may update the adaptive frequency coefficients 290 in real-time or substantially near real-time in order to reduce and/or compensate for frequency errors caused by the PLL circuit 230.

Figure 3:
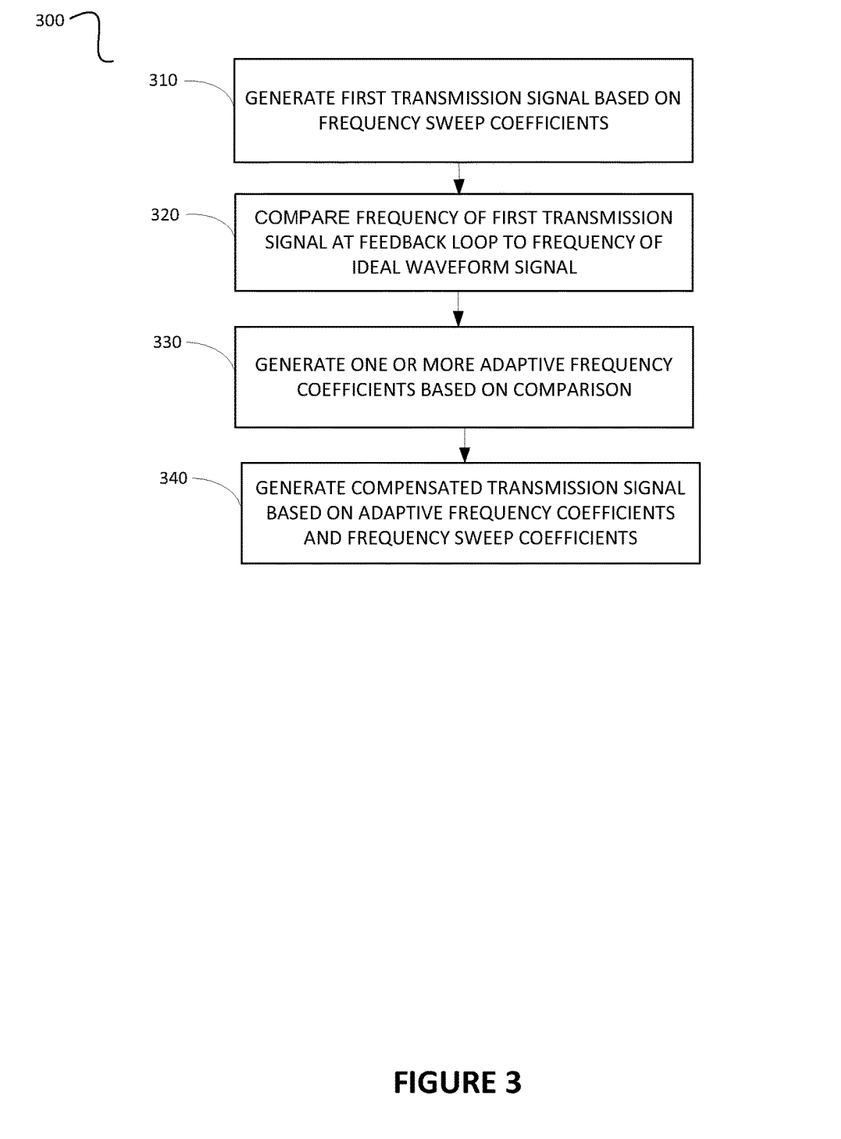
FIG. 3 illustrates a flow diagram of a method for frequency correction in a pulse compression radar system in accordance with implementations of various techniques described herein.

FIG. 3 illustrates a flow diagram of a method 300 for frequency correction in a pulse compression radar system in accordance with implementations of various techniques described herein. In one implementation, method 300 may be performed by one or more components, including a pulse compression radar system. It should be understood that while method 300 indicates a particular order of execution of operations, in some implementations, certain portions of the operations might be executed in a different order. Further, in some implementations, additional operations or steps may be added to the method 300. Likewise, some operations or steps may be omitted.

At block 310, the pulse compression radar system may generate a first transmission signal based on one or more frequency sweep coefficients. As noted above, the one or more frequency sweep coefficients may correspond to the correlator reference signal (i.e., the ideal waveform signal).

At block 320, a frequency of the first transmission signal at a feedback loop of the phase locked loop circuit may be compared to a frequency of the ideal waveform signal. As noted above, in one implementation, the output of the down conversion circuitry of the feedback loop may be fed into the ADC and converted into a sampled digital signal, and then may have its frequency compared to the frequency of an output waveform signal of a second DDS.

At block 330, one or more adaptive coefficients may be generated based on the comparison. As noted above, these adaptive frequency coefficients may be used to compensate for the frequency differences between the distorted signal from the PLL circuit (i.e., the converted analog signal from the feedback loop) and the correlator reference signal (e.g., the output waveform signal of the second DDS).

At block 340, a compensated transmission signal may be generated based on the one or more adaptive frequency coefficients and the one or more frequency sweep coefficients. As noted above, the system may combine the adaptive frequency coefficients with the frequency sweep coefficients as inputs to the first DDS in order to produce the compensated transmitted signal.

In summary, implementations relating to adaptive frequency correction for pulse compression radar, described above with respect to FIGS. 1-3, may be used by a pulse compression radar system to produce a corrected and/or compensated transmitted signal that is at least substantially equivalent to a correlator reference signal, at least with respect to frequency. In particular, the frequency pre-distortion coefficients of the system may be used to reduce and/or compensate for distortions in a transmitted signal of the system.

Computing System

Implementations of various technologies described herein may be operational with numerous general purpose or special purpose computing system environments or configurations. Examples of well-known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, marine electronics devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. Further, each program module may be implemented in its own way, and all need not be implemented the same way. While program modules may all execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may be implemented in the context of marine electronics, such as devices found in marine vessels and/or navigation systems.

The various technologies described herein may also be implemented in distributed computing environments where tasks are performed by remote processing devices that are linked through a communications network, e.g., by hard-wired links, wireless links, or combinations thereof. In a distributed computing environment, program modules may be located in both local and remote computer storage media including memory storage devices.

Figure 4:
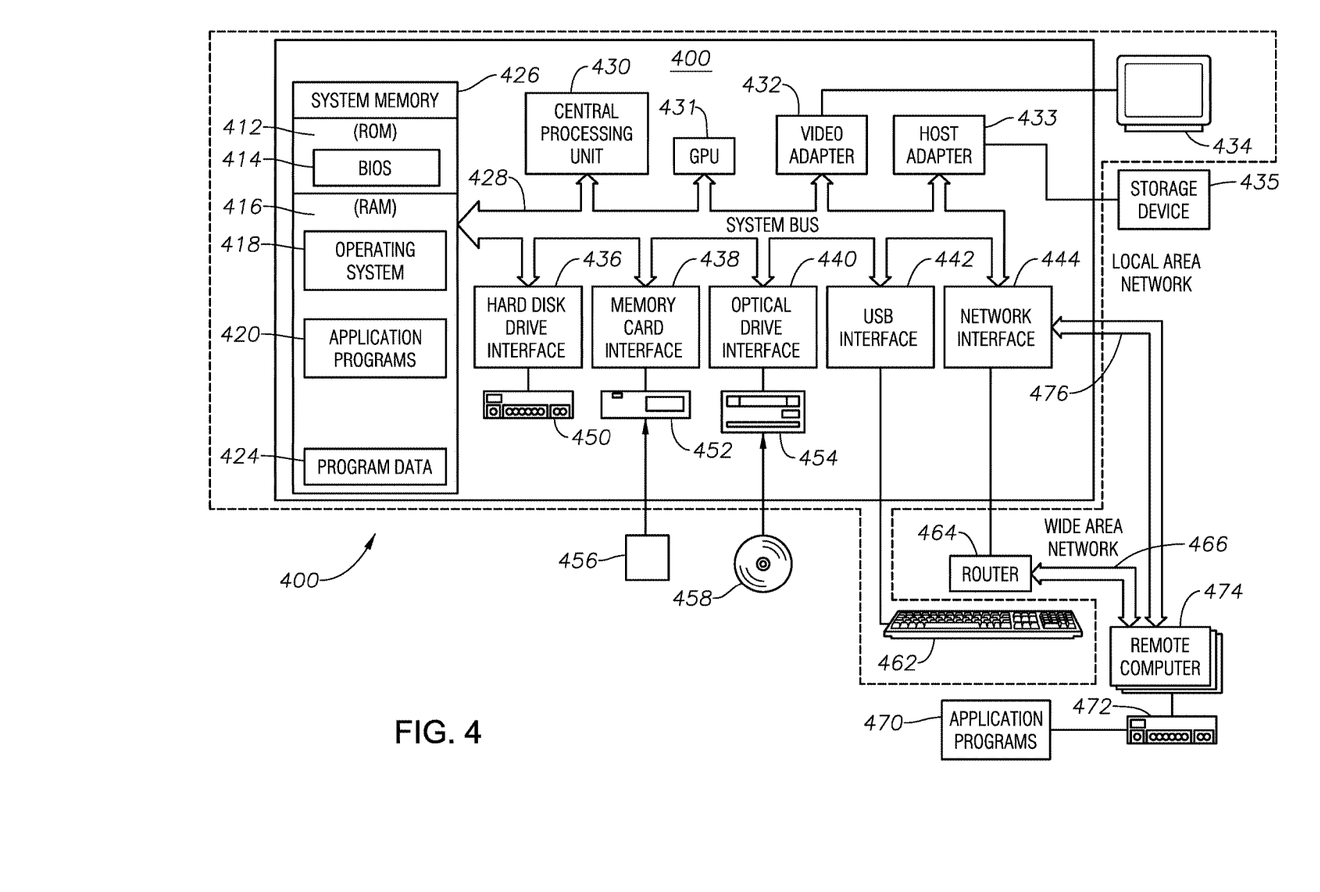
FIG. 4 illustrates a computer system into which implementations of various technologies and techniques described herein may be implemented.

FIG. 4 illustrates a computer system 400 into which implementations of various technologies and techniques described herein may be implemented. Computing system 400 may be a conventional desktop, a handheld device, a wearable device, a controller, a personal digital assistant, a server computer, an electronic device/instrument, a laptop, a tablet, or part of a navigation system, marine electronics, radar system, or sonar system. It should be noted, however, that other computer system configurations may be used.

The computing system 400 may include a central processing unit (CPU) 430, a system memory 426 and a system bus 428 that couples various system components including the system memory 426 to the CPU 430. Although only one CPU 430 is illustrated in FIG. 4, it should be understood that in some implementations the computing system 400 may include more than one CPU 430.

The CPU 430 can include a microprocessor, a microcontroller, a processor, a programmable integrated circuit, or a combination thereof. The CPU 430 can comprise an off-the-shelf processor such as a Reduced Instruction Set Computer (RISC), including an Advanced RISC Machine (ARM) processor, or a Microprocessor without Interlocked Pipeline Stages (MIPS) processor, or a combination thereof. The CPU 430 may also include a proprietary processor. The CPU may include a multi-core processor.

The CPU 430 may provide output data to a Graphics Processing Unit (GPU) 431. The GPU 431 may generate graphical user interfaces that present the output data. The GPU 431 may also provide objects, such as menus, in the graphical user interface. A user may provide inputs by interacting with the objects. The GPU 431 may receive the inputs from interaction with the objects and provide the inputs to the CPU 430. In one implementation, the CPU 430 may perform the tasks of the GPU 431. A video adapter 432 may be provided to convert graphical data into signals for a monitor 434, which may also be referred to as a screen. The monitor 434 can be sensitive to heat or touching (now collectively referred to as a "touch screen"). In one implementation, the computer system 400 may not include a monitor 434.

The GPU 431 may be a microprocessor specifically designed to manipulate and implement computer graphics. The CPU 430 may offload work to the GPU 431. The GPU 431 may have its own graphics memory, and/or may have access to a portion of the system memory 426. As with the CPU 430, the GPU 431 may include one or more processing units, and each processing unit may include one or more cores.

The system bus 428 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 426 may include a read only memory (ROM) 412 and a random access memory (RAM) 416. A basic input/output system (BIOS) 414, containing the basic routines that help transfer information between elements within the computing system 400, such as during start-up, may be stored in the ROM 412. The computing system may be implemented using a printed circuit board containing various components including processing units, data storage memory, and connectors.

Certain implementations may be configured to be connected to a GPS and/or a sonar system. The GPS and/or sonar system may be connected via the network interface 444 or Universal Serial Bus (USB) interface 442. In one implementation, the computing system 400, the monitor 434, the screen 405 and buttons may be integrated into a console.

The computing system 400 may further include a hard disk drive 436 for reading from and writing to a hard disk 450, a memory card reader 452 for reading from and writing to a removable memory card 456 and an optical disk drive 454 for reading from and writing to a removable optical disk 458, such as a CD ROM, DVD ROM or other optical media. The hard disk drive 450, the memory card reader 452 and the optical disk drive 454 may be connected to the system bus 428 by a hard disk drive interface 436, a memory card interface 438 and an optical drive interface 440, respectively. The drives and their associated computer-readable media may provide nonvolatile storage of computer-readable instructions, data structures, program modules and other data for the computing system 400.

Although the computing system 400 is described herein as having a hard disk 450, a removable memory card 456 and a removable optical disk 458, it should be appreciated by those skilled in the art that the computing system 400 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, including a Solid State Disk (SSD), CD-ROM, digital versatile disks (DVD), or other optical storage, magnetic cassettes, magnetic tape, magnetic disk storage or other magnetic storage devices, or any other medium which can be used to store the desired information and which can be accessed by the computing system 400. Communication media may embody computer readable instructions, data structures, program modules or other data in a modulated data signal, such as a carrier wave or other transport mechanism and may include any information delivery media. By way of example, and not limitation, communication media may include wired media such as a wired network or direct-wired connection, and wireless media such as acoustic, RF, infrared and other wireless media. The computing system 400 may also include a host adapter 433 that connects to a storage device 435 via a small computer system interface (SCSI) bus, a Fiber Channel bus, an eSATA bus, or using any other applicable computer bus interface. The computing system 400 can also be connected to a router 464 to establish a wide area network (WAN) 466 with one or more remote computers 474. The router 464 may be connected to the system bus 428 via a network interface 444. The remote computers 474 can also include hard disks 472 that store application programs 470.

In another implementation, the computing system 400 may also connect to one or more remote computers 474 via local area network (LAN) 476 or the WAN 466. When using a LAN networking environment, the computing system 400 may be connected to the LAN 476 through the network interface or adapter 444. The LAN 476 may be implemented via a wired connection or a wireless connection. The LAN 476 may be implemented using Wi-Fi technology, cellular technology, or any other implementation known to those skilled in the art. The network interface 444 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 474. It will be appreciated that the network connections shown are exemplary and other means of establishing a communications link between the computer systems may be used. The network interface 444 may also include digital cellular networks, Bluetooth, or any other wireless network interface.

A number of program modules may be stored on the hard disk 450, memory card 456, optical disk 458, ROM 412 or RAM 416, including an operating system 418, one or more application programs 420, program data 424 and a database system. The operating system 418 may be any suitable operating system that may control the operation of a networked personal or server computer, such as Windows® XP, Mac OS® X, Unix-variants (e.g., Linux® and BSD®), Android®, iOS®, and the like.

A user may enter commands and information into the computing system 400 through input devices such as a keyboard 462 and pointing device. Other input devices may include a microphone, joystick, game pad, satellite dish, scanner, user input button, wearable device, or the like. These and other input devices may be connected to the CPU 430 through a USB interface 442 coupled to system bus 428, but may be connected by other interfaces, such as a parallel port, Bluetooth or a game port. A monitor 405 or other type of display device may also be connected to system bus 428 via an interface, such as a video adapter 432. In addition to the monitor 434, the computing system 400 may further include other peripheral output devices such as speakers and printers.

It is to be understood that the discussion above is only for the purpose of enabling a person with ordinary skill in the art to make and use any subject matter defined now or later by the patent "claims" found in any issued patent herein.

It is specifically intended that the claimed invention not be limited to the implementations and illustrations contained herein, but include modified forms of those implementations including portions of the implementations and combinations of elements of different implementations as come within the scope of the following claims. Nothing in this application is considered critical or essential to the claimed invention unless explicitly indicated as being "critical" or "essential."

Reference has been made in detail to various implementations, examples of which are illustrated in the accompanying drawings and figures. In the detailed description, numerous specific details are set forth in order to provide a thorough understanding of the present disclosure. However, it should be apparent to one of ordinary skill in the art that the present disclosure may be practiced without these specific details. In other instances, well-known methods, procedures, components, circuits and networks have not been described in detail so as not to unnecessarily obscure aspects of the implementations.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It should also be understood that the term "and/or" as used herein refers to and encompasses any and all possible combinations of one or more of the associated listed items. It should be further understood that the terms "includes," "including," "comprises" and/or "comprising," when used in this specification, specify the presence of stated features, integers, steps, operations, elements, and/or components, but should not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

"Alternatively" should not be construed to only pertain to situations where the number of choices involved is exactly two, but rather refers to another possibility among many other possibilities.

Additionally, various technologies and techniques described herein include receiving user requests for a number of different operations. In certain instances, the user request for a particular operation will be explicitly described. It should be understood that a "request" or "can request" can also include, but are not limited to, touching a screen, double tapping a screen (tapping the screen twice in rapid succession), pressing a particular physical or virtual button, making a selection from a menu, swiping the screen (placing a finger towards an edge of the screen and traversing the screen while maintaining contact between the finger and the screen) placement of a cursor at a particular location, stylus pointing, mouse selection, an audible command, as well as the explicit description of the "request" for the particular operations.

While the foregoing is directed to implementations of various techniques described herein, other and further implementations may be devised without departing from the basic scope thereof, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
    generating a first transmission signal using a first direct digital synthesizer of a pulse compression radar system based on one or more frequency sweep coefficients, wherein the one or more frequency sweep coefficients correspond to an ideal waveform signal, and wherein the pulse compression radar system includes a phase locked loop circuit;
    comparing a frequency of the first transmission signal at a feedback loop of the phase locked loop circuit and a frequency of the ideal waveform signal;
    generating one or more adaptive frequency coefficients based on the comparison, wherein the one or more adaptive frequency coefficients are configured to compensate for a difference between the frequency of the first transmission signal at the feedback loop and the frequency of the ideal waveform signal; and
    generating a compensated transmission signal using the pulse compression radar system based on the one or more adaptive frequency coefficients and the one or more frequency sweep coefficients.

2. The method of claim 1, wherein the first transmission signal at the feedback loop of the phase locked loop circuit comprises a down converted output signal from a voltage controlled oscillator of the phase locked loop.

3. The method of claim 1, wherein comparing comprises comparing the frequency of the first transmission signal at the feedback loop of the phase locked loop circuit and a frequency of an output signal of a second direct digital synthesizer, wherein the output signal is generated based on the one or more frequency sweep coefficients.

4. The method of claim 3, wherein the one or more adaptive frequency coefficients are configured to compensate for a difference between the frequency of the first transmission signal at the feedback loop and the frequency of the output signal of the second direct digital synthesizer.

5. The method of claim 1, wherein comparing comprises comparing a time-frequency curve of the first transmission signal at the feedback loop to a time-frequency curve of the ideal waveform signal.

6. The method of claim 1, wherein generating the compensated transmission signal comprises:
    subtracting the one or more adaptive frequency coefficients from the one or more frequency sweep coefficients; and
    using the difference between the one or more adaptive frequency coefficients and the one or more frequency sweep coefficients as an input to the first direct digital synthesizer.

7. The method of claim 1, wherein generating the compensated transmission signal comprises:
    inverting the one or more adaptive frequency coefficients;
    adding the inverted one or more adaptive frequency coefficients and the one or more frequency sweep coefficients to produce a sum; and
    using the sum as an input to the first direct digital synthesizer.

8. The method of claim 1, wherein generating the compensated transmission signal comprises:
    expressing the one or more adaptive frequency coefficients as one or more correction ratios;
    multiplying the one or more correction ratios with the one or more frequency sweep coefficients to produce a product; and
    using the product as an input to the first direct digital synthesizer.

9. The method of claim 1, further comprising continuously updating the one or more adaptive frequency coefficients.

10. The method of claim 1, further comprising generating the one or more adaptive frequency coefficients in real-time or substantially near real-time.

11. A method, comprising:
    generating a first transmission signal using a first direct digital synthesizer of a pulse compression radar system based on one or more frequency sweep coefficients, wherein the one or more frequency sweep coefficients correspond to an ideal waveform signal, and wherein the pulse compression radar system includes a phase locked loop circuit;
    comparing a frequency of the first transmission signal at a feedback loop of the phase locked loop circuit and a frequency of an output signal of a second direct digital synthesizer, wherein the first transmission signal at the feedback loop of the phase locked loop circuit comprises a down converted output signal from a voltage controlled oscillator of the phase locked loop, and wherein the output signal is generated based on the one or more frequency sweep coefficients;
    generating one or more adaptive frequency coefficients based on the comparison, wherein the one or more adaptive frequency coefficients are configured to compensate for a difference between the frequency of the first transmission signal at the feedback loop and the frequency of the ideal waveform signal; and
    generating a compensated transmission signal using the pulse compression radar system based on the one or more adaptive frequency coefficients and the one or more frequency sweep coefficients.

12. The method of claim 11, wherein the one or more adaptive frequency coefficients are configured to compensate for a difference between the frequency of the first transmission signal at the feedback loop and the frequency of the output signal of the second direct digital synthesizer.

13. The method of claim 11, wherein generating the compensated transmission signal comprises:
    subtracting the one or more adaptive frequency coefficients from the one or more frequency sweep coefficients; and
    using the difference between the one or more adaptive frequency coefficients and the one or more frequency sweep coefficients as an input to the first direct digital synthesizer.

14. The method of claim 11, wherein generating the compensated transmission signal comprises:
    inverting the one or more adaptive frequency coefficients;

adding the inverted one or more adaptive frequency coefficients and the one or more frequency sweep coefficients to produce a sum; and using the sum as an input to the first direct digital synthesizer.

15. The method of claim 11, wherein generating the compensated transmission signal comprises:

expressing the one or more adaptive frequency coefficients as one or more correction ratios;

multiplying the one or more correction ratios with the one or more frequency sweep coefficients to produce a product; and using the product as an input to the first direct digital synthesizer.

16. The method of claim 11, further comprising continuously updating the one or more adaptive frequency coefficients.

17. The method of claim 11, further comprising generating the one or more adaptive frequency coefficients in real-time or substantially near real-time.

18. A pulse compression radar system, comprising:

a processor;

a memory comprising a plurality of program instructions which, when executed by the processor, cause the processor to store in memory:

one or more frequency sweep coefficients, wherein the one or more frequency sweep coefficients correspond to an ideal waveform signal; and one or more adaptive frequency coefficients;

a first direct digital synthesizer configured to generate a signal based on the one or more frequency sweep coefficients and the one or more adaptive frequency coefficients;

a phase locked loop circuit configured to convert the frequency of the signal from the first direct digital synthesizer; and a transmitter module configured to amplify the converted signal from the phase locked loop circuit for output by an antenna;

wherein the one or more adaptive frequency coefficients are generated based on a comparison of a frequency of a transmission signal at a feedback loop of the phase locked loop circuit and a frequency of the ideal waveform signal.

19. The pulse compression radar system of claim 18, wherein the transmission signal at the feedback loop of the phase locked loop circuit comprises a down converted output signal from a voltage controlled oscillator of the phase locked loop.

20. The pulse compression radar system of claim 18, wherein the one or more adaptive frequency coefficients are generated based on a comparison of the frequency of the transmission signal at the feedback loop of the phase locked loop circuit and a frequency of an output signal of a second direct digital synthesizer.

\* \* \* \* \*

UNITED STATES PATENT AND TRADEMARK OFFICE
CERTIFICATE OF CORRECTION

PATENT NO. : 10,054,670 B2
APPLICATION NO. : 15/004764
DATED : August 21, 2018
INVENTOR(S) : Roger Phillips et al.

Page 1 of 1

It is certified that error appears in the above-identified patent and that said Letters Patent is hereby corrected as shown below:

On the Title Page

Item (73), Assignee:
NAVICO HOLDING AS, Edersund (NO)
Should read:
NAVICO HOLDING AS, Egersund (NO)

Signed and Sealed this
Eighteenth Day of June, 2019

Andrei Iancu
*Director of the United States Patent and Trademark Office*